United States Patent [19]
Boroschewski et al.

[11] 3,895,046
[45] July 15, 1975

[54] CYANOPHENYL ESTERS OF OXIME-O-CARBONIC ACID

[75] Inventors: Gerhard Boroschewski; Reinhold Puttner; Friedrich Arndt, all of Berlin, Germany

[73] Assignee: Schering Aktiengesellschaft, Berlin and Bergkamen, Germany

[22] Filed: Feb. 26, 1973

[21] Appl. No.: 335,662

[30] Foreign Application Priority Data
Mar. 2, 1972 Germany............................ 2210540

[52] U.S. Cl. ..................... 260/463; 71/105; 71/90; 71/92; 71/100
[51] Int. Cl. ..................... C07c 131/00; A01n 9/20
[58] Field of Search ........................ 260/463, 465 P

[56] References Cited
UNITED STATES PATENTS
3,624,091   11/1971   Daum et al. ....................... 260/463
3,641,062   2/1972   Ost et al. ........................... 260/463

OTHER PUBLICATIONS
Chemical Abstracts, Vol. 78, 29461 X, (1973).

Primary Examiner—Donald G. Daus
Assistant Examiner—Diana G. Rivers
Attorney, Agent, or Firm—Joseph F. Padlon

[57] ABSTRACT
Cyanophenyl carbonates are prepared and used as herbicidal agents and as potentiating mixtures for their herbicidal effect.

12 Claims, No Drawings

CYANOPHENYL ESTERS OF OXIME-O-CARBONIC ACID

The invention relates to new cyanophenyl carbonates, processes for the production thereof, and herbicidal agents containing cyanophenyl carbonate compounds and their potentiating mixtures with other active substances.

Halogen-substituted benzonitriles with herbicidal effect are already known. One of their most important representatives is 3,5-diiodo-4-hydroxy-benzonitrile of German Patent No. 1,266,563. This active substance and its derivatives have, however, the disadvantage of insufficient effect, in particular toward the millet species *Echinochioa crus galli* occurring in rice cultivations.

It is therefore a specific object of the invention to develop a weed killer suitable to control the millet species *Echinochioa crus galli*. It has now been found that compounds of the general formula

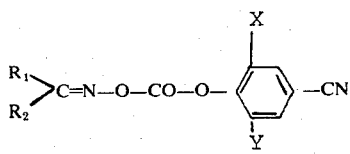

in which
  $R_1$ and $R_2$ are identical or different and represent a possibly mono- or polysubstituted aromatic, aliphatic, cycloaliphatic or araliphatic hydrocarbon radical,
  $R_1$, additionally hydrogen,
  $R_1$ and $R_2$ jointly with the carbon atom, a possibly mono- or polysubstituted cycloaliphatic hydrocarbon radical, and
  X and Y represent an identical or different halogen atom,
are herbicidal and exert an excellent effect in particular toward the millet species *Echinochioa crus galli*.

It must be rated as a particular advantage here that this weed can be combated without damage to the rice plants.

The effect of these compounds extends moreover to other weeds, such as *Stellaria media, Senecio vulgaris, Lamium amplexicaule, Ipomoea purpurea, Polygonum lapathifolium, Centaurea cyanus, Amarantus retroflexus, Chrysanthemum segetum, Setaria italica, Sinapis sp.* and *Solanum sp.*

It has also been found that compounds according to the invention exhibit excellent selective properties also for the cereals wheat, barley, rye and oat.

The quantities to be used are, depending on the area of application and type of weed, about 0.25 to 3 kg active substance per hectare.

By the halogen substituents of the phenyl radical marked X and Y in the general formula that iodine, chlorine and bromine atoms are meant and the substituents are preferably identical.

For $R_1$ and $R_2$ there enter into consideration aromatic hydrocarbon radicals, for example, the phenyl or naphthyl radical, the aliphatic hydorcarbon radicals with 1 to 12 carbon atoms, such as methyl, ethyl, propyl, isopropyl, butyl and others; cycloaliphatic hydrocarbon radicals with 5 to 8 carbon atoms, such as cyclohexyl and others, and as araliphatic hydrocarbon radicals, for example, benzyl or phenylethyl and others, these radicals possibly being for example equally or differently substituted by low alkyl radicals, such as methyl or ethyl, the halogen atoms, such as chlorine or bromine, low alkoxy radicals, such as methoxy or ethoxy and others.

$R_1$ and $R_2$ may also form a cycloaliphatic 5- to 8-member ring, for example, cyclohexyl or cyclooctyl and others, which may possibly be mono- or polysubstituted by low alkyl radicals, such as methyl, or other groups.

It has further been found that mixtures containing at least two non-identical compounds of the defined general formula above exhibit an effect which is higher than the effect of the individual components at equal concentrations of application.

Such mixtures show, for example, in quantities of use which are still at the minimum limit of action of the individual components, a sufficient action against weeds that are not controlled with corresponding quantities of the single components of the mixtures according to the invention.

The mixture ratio of the single components in the mixtures may vary within wide limits and depends on the desired control, on the type of weeds to be controlled, or plants not wanted; the age of the weeds or plants, the prevailing weather conditions, and the technique of application. It is therefore not possible to state from the beginning a certain mixture ratio which would suffice for all possibilities equally, although on the other hand the found effects are not strictly dependent on certain mixture conditions. By corresponding preliminary tests, however, the specialist is easily able to determine the best mixture ratio for the intended purpose. In general, the mixture ratio for a two-component mixture may be about 4:1 to about 1:4, preferably about 1:2 to about 2:1.

The compounds of the invention can be used, however, not only alone or as mixture of several active substances, but also as an admixture with other plant protecting agents or pesticides, such as, insecticides, fungicides or according to the desired purpose, with other agents.

If, for example, a broadening of the sprectrum of action is intended, other herbicides may be added, in which case frequently synergistic effects occur.

It has further been found that by combination of the compounds of the invention with growth-substance herbicides with phenoxycarboxylic acids or phenoxycarboxylic acid amides, with ether compounds, in particular, substituted diphenyl ethers, substituted triazines, ureas or anilides for weed control in cereals and rice; the following improvements of the commercial herbicides are obtained: Enlargement of the range of action, higher effectiveness, greater independence of action from the growth stage of the weeds at time of treatment, and hence a general greater certainty of the herbicidal result, especially in spring application in winter cereals against weed greases and dicotyledoneal weeds.

As further effective mixture partners which are suitable, there may be used active substances from the following groups: carbamic acid and thiocarbamic acid esters, the substituted anilines, aminotriazoles, diazines, aliphatic carboxylic acids and halogen carboxylic acids, halogenated benzoic acids and phenylacetic acids, hydrazides, amides nitriles, benzimidazoles, quinazolines, dipyridyl derivatives, substituted oxadiazines and oxadiazolines, substituted thiadiazoles and thiadiazines, benzoxazines, and growth regulators, such as 2-chlorethyl trimethyl ammonium chloride.

Depending on the purpose of application, other substances may also be added, for example, non-phytotoxic additions, which may result in a synergistic increase of action with herbicides, such as wetting agents, solvents, oily additions and others.

Appropriately, the active substances of the mixtures in the invention include preparations, such as powders, scatters, granulates, solutions, emulsions or suspensions, with the addition of liquid and/or solid vehicles or diluents and if desired, of wetting, adhesive, emulsifying and/or dispersing aids.

Suitable liquid vehicles are, for example, water, aliphatic and aromatic hydrocarbons, such as benzene, toluene, cyclohexanone, isophorone, also mineral oil fractions.

As solid vehicles which are suitable are the mineral earths, for example, siliceous clay, silica gel, talc, kaolin, attaclay, limestone, silicic acid, and plant products, such as flours.

Among surface-active substances that may be named are calcium lignin sulfonate, polyoxyethylene-octyl phenol ether, naphthalene sulfonic acids, phenol sulfonic acids, formaldehyde condensates, fat alcohol sulfates, and fatty acid alkaline or alkaline earth salts.

The proportion of the active substance or substances in the various preparations may vary within wide limits. The agents contain, for example, about 20 to 80 percent by weight of active substances, about 80 to 20 percent by weight of liquid or solid vehicles, and optionally up to 20 percent by weight of surface-active substances.

Application of the agents is effected in the usual manner, namely, with water as vehicle in liquid spray quantities of 100 to 1000 liters/ha. For total weed control also the partly common liquid spray quantities of more than 1000 liters/ha may readily be applied. Also an application of the agents in the so-called "Ultra-low-volume process" is possible. In addition, the method of application in microgranulate form may be used.

The defined new compounds are produced, for example, by reacting compounds of the general formula

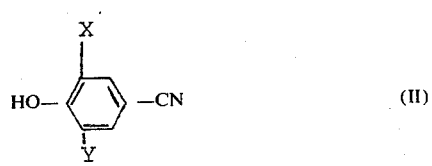

or their alkali salts
a. with halogen formyl oximes of the general formula

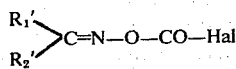

with addition of a tertiary organic base, as for example triethylamine or N,N-dimethyl aniline, or b. first with phosgene, appropriately with the use of an organic solvent, to the corresponding chloroformic acid ester of the general formula

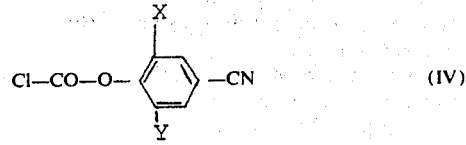

and causing the latter to react with an oxime of the general formula

in the presence of an organic or tertiary organic base, such as triethylamine $R'_1$, $R'_2$, $R''_1$, $R''_2$ having in the general formulas the meaning stated above of $R_1$ and/or $R_2$, and Hal being a halogen atom.

The following examples are illustrative of the method of production of the compounds of the invention.

a. 1-ethylethylidenamino-(2,6-diiodo-4-cyanophenyl) carbonate

A solution of 17.3 g chloroformic acid-2,6-diiodo-4-cyanophenyl ester in 50 ml tetrahydrofurane is dropped into a solution of 3.48 g (0.04 mole) methylethyl ketoxime and 5.6 ml triethylamine in 50 ml of tetrahydrofurane while stirring at 18° to 20° C. Stirring is continued for 3 hours at room temperature, and then the product is poured on ice and the organic phase washed at 0° C with dilute NaOH and water. After drying with magnesium sulfate, the product is concentrated under reduced pressure. The residue crystallizes on additon of pentane.
M.p.: 107°–108° C (decomposition)
Yield: 15.0 g = 77% of the theory b. Isopropylidenamino-2,6-diiodo-4-cyanophenyl carbonate The sodium salt produced from 18.55 g (0.05 mole) 3,5-diiodo-4-hydroxybenzonitrile is suspended in 50 ml acetonitrile. While stirring, 6.75 g acetonoxime-O-carboxylic acid chloride are dropped in, the temperature rising to about 30° C. Stirring is continued for 45 minutes at 50° C. After cooling to room temperature, the product is poured on ice and the organic phase washed with dilute NaOH and water at 0° C. The product is dried with magnesium sulfate and concentrated under reduced pressure. The residue is admixed with 100 ml ether and the reaction product suction filtered.
M.p.: 167°–168° C (decomposition)
Yield: 10.8 g = 47% of the theory c. Isopropylidenamino-2,6-dibromo-4-cyanophenyl carbonate To a solution of 13.85 g (0.05 mole), 3,5-dibromo-4-hydroxybenzonitrile in 350 ml chloroform and 5.3 g (0.052 mole) triethylamine, a solution of 7.11 g (0.052 mole) 2-oximinopropane-O-carboxylic acid chloride in 50 ml chlorform is added drop by drop at 0° C while stirring within 15 minutes. Then stirring is continued for 3 hours at room temperature. To remove the triethylamine hydrochloride formed, the reaction mixture is washed three times with about 200 ml water each time. The chloroform phase is dried over magnesium sulfate, and the solvent removed under vacuum. The colorless, crystalline reaction product can be recrystallized from methanol.

M.p.: 145°–146° C

Yield: 16.0 g = 85% of the theory d. Isopropylidenamino-2,6-dichloro-4-cyanophenyl carbonate A solution of 8.83 g (0.065 mole) 2-oximinopropane-O-carboxylic acid chloride in 50 ml chloroform is added drop by drop to a solution of 11.6 g (0.062 mole) 3,5-dichloro-4-hydroxybenzonitrile in 250 ml chloroform and 6.56 g (0.065 mole) triethylamine while stirring at 0° C within 15 minutes. Then stirring is continued for 3 hours at room temperature. To remove the triethylamine hydrochloride formed, the reaction mixture is washed three times with about 200 ml water each time. The chloroform phase is dried over magnesium sulfate, while the solvent is removed under vacuum. The colorless, crystalline reaction product can be recrystallized from methanol.

M.p.: 96°–98° C.

Yield: 13.0 g = 73% of the theory

In the following table some additional compounds made according to the invention, are listed

| Compound | Physical Constant |
| --- | --- |
| 1. 3,3,5-trimethylcyclohexene-(5)-ylidenamino-(2,6-diiodo-4-cyanphenyl)-carbonate | M.P.: 151 – 152°C |
| 2. 1-ethylpropylidenamino-(2,6-diiodo-4-cyanphenyl)-carbonate | M.P.: 102 – 104°C |
| 3. 1-sec.-butyl-ethylidenamino-(2,6-diiodo-4-cyanphenyl)-carbonate | $n_D^{20} = 1.5620$ |
| 4. 1-n-propylethylidenamino-(2,6-diiodo-4-cyanphenyl)-carbonate | M.P.: 92 – 94°C |
| 5. 1-isopropylethylidenamino-(2,6-diiodo-4-cyanphenyl)-carbonate | M.P.: 115 – 117°C |
| 6. 1-methylpropylidenamino-(2,6-dibromo-4-cyanophenyl)-carbonate | M.P.: 82 – 83°C |
| 7. 1-methylpropylidenamino-(2,6-dichloro-4-cyanophenyl)-carbonate | M.P.: 69 – 70°C |
| 8. 4-methylpentyliden-2-amino-(2,6-dibromo-4-cyanophenyl)-carbonate | M.P.: 71 – 72.5°C |
| 9. 1-isopropyl-2-methylpropylidenamino-(2,6-diiodo-4-cyanophenyl)-carbonate | M.P.: 91 – 93°C |
| 10. 1-isopropyl-2-methylpropylidenamino-(2,6-diiodo-4-cyanophenyl)-carbonate | M.P.: 117 – 119°C |
| 11. 1,2-dimethylibutyldenamino-(2,6-diiodo-4-cyanophenyl)-carbonate | M.P.: 115 – 117°C |
| 12. 2-ethyl-1-methyl-butylidenamino-(2,6-diiodo-4-cyanophenyl)-carbonate | M.P.: 120 – 122°C |
| 13. 1-isobutyl-3-methylbutylidenamino-(2,6-diiodo-4-cyanophenyl)-carbonate | M.P.: 108 – 110°C |
| 14. 1-ethylhexylidenamino-(2,6-diiodo-4-cyanophenyl)-carbonate | M.P.: 50 – 52°C |
| 15. 1-propylpentylidenamino-(2,6-diiodo-4-cyanophenyl)-carbonate | M.P.: 102 – 103°C |
| 16. ethyl-propylidenamino-(2,6-dibromo-4-cyanophenyl)-carbonate | M.P.: 71 – 72°C |
| 17. 1,2-dimethylpropylidenamino-(2,6-dibromo-4-cyanophenyl)-carbonate | M.P.: 94 – 97°C |
| 18. methyl-butylidenamino-(2,6-dibromo-4-cyanophenyl)-carbonate | M.P.: 69 – 72°C |
| 19. methylpentylidenamino-(2,6-dibromo-4-cyanophenyl)-carbonate | $n_D^{20} = 1.5455$ |
| 20. propyl-butylidenamino-(2,6-dibromo-4-cyanophenyl)-carbonate | M.P.: 58 – 62°C |
| 21. methyl-heptylidenamino-(2,6-dibromo-4-cyanophenyl)-carbonate | $n_D^{20} = 1.5348$ |
| 22. methylpentylidenamino-(2,6-dichloro-4-cyanophenyl)-carbonate | $n_D^{20} = 1.5269$ |
| 23. 1,2,2-trimethylpropylidenamino-(2,6-dibromo-4-cyanophenyl)-carbonate | M.P.: 117 – 118°C |
| 24. methyl-hexylidenamino-(2,6-dibromo-4-cyanophenyl)-carbonate | $n_D^{20} = 1.5380$ |
| 25. methyl-hexylidenamino-(2,6-dichloro-4-cyanophenyl)-carbonate | $n_D^{20} = 1.5150$ |
| 26. diisobutylmethylenamino-(2,6-dibromo-4-cyanophenyl)-carbonate | $n_{20}^D = 1.5239$ |
| 27. 1-ethyl-3-methylpentylidenamino-(2,6-dibromo-4-cyanophenyl)-carbonate | $n_{20}^D = 1.5360$ |
| 28. cyclopentylidenamino-(2,6-dibromo-4-cyanophenyl)-carbonate | M.P.: 134 – 137°C |
| 29. cyclooctylidenamino-(2,6-dibromo-4-cyanophenyl)-carbonate | M.P.: 118°C |
| 30. methyldecylidenamino-(2,6-dibromo-4-cyanophenyl)-carbonate | $n_{20}^D = 1.5178$ |
| 31. 3,5,5-trimethyl-2-cyclohexenyliden-amino-(2,6-dibromo-4-cyanophenyl)-carbonate | M.P.: 134 – 142°C |
| 32. 1-methyl-2-phenylethylidenamino-(2,6-dibromo-4-cyanophenyl)-carbonate | M.P.: 110 – 111°C |
| 33. 1-methyl-3-phenylpropylidenamino-(2,6-dibromo-4-cyanophenyl)-carbonate | M.P.: 142 – 144°C |
| 34. 1-(4-methoxyphenyl)-ethylidenamino-(2,6-diiodo-4-cyanophenyl)-carbonate | M.P.: 117 – 119°C |
| 35. 1-tert.-butylethylidenamino-(2,6-diiodo-4-cyanophenyl)-carbonate | M.P.: 98 – 100°C |
| 36. cyclohexylidenamino-(2,6-dibromo-4-cyanophenyl)-carbonate | M.P.: 105 – 108°C |

| Compound | Physical Constant |
|---|---|
| 37. 1-methyl-2-methyl-butylidenamino-(2,6-dibromo-4-cyanophenyl)-carbonate | M.P.: 87°C |
| 38. diisopropylmethylenamino-(2,6-dibromo-4-cyanophenyl)-carbonate | M.P.: 92°C |
| 39. cycloheptylidenamino-(2,6-dibromo-4-cyanophenyl)-carbonate | M.P.: 98 – 101°C |
| 40. Chlormethyl-phenylmethylenamino-(2,6-dibromo-4-cyanophenyl)-carbonate | M.P.: 148 – 151°C |
| 41. 1-ethylhexylidenamino-(2,6-dibromo-4-cyanophenyl)-carbonate | $n_{20}^D = 1.5382$ |
| 42. 1-butyl-pentylidenamino-(2,6-dibromo-4-cyanophenyl)-carbonate | $n_{20}D = 1.5305$ |
| 43. 1-phenoxymethyl-ethylidenamino-(2,6-dibromo-4-cyanophenyl)-carbonate | $n_{20}^D = 1.5828$ |
| 44. 1,4-dimethyl-pentylidenamino-(2,6-dibromo-4-cyanophenyl)-carbonate | $n_{20}^D = 1.5410$ |
| 45. isopropylidenamino-(2-bromo-6-iodo-4-cyanophenyl)-carbonate | M.P.: 158 – 159°C |
| 46. isopropylidenamino-(2-chloro-6-iodo-4-cyanophenyl)-carbonate | M.P.: 149 – 151°C |
| 47. isopropylidenamino-(2-chloro-6-bromo-4-cyanophenyl)-carbonate | M.P.: 121 – 123°C |
| 48. 1-benzoylethylidenamino-(2,6-diiodo-4-cyanophenyl)-carbonate | M.P.: 110 – 111°C |

They are colorless and odorless, usually crystalline substance. They are insoluble in water and benzine and more or less soluble in acetone, tetrahydrofurane, cyclohexanone, isophorone and dimethyl formamide.

The starting products of the compounds according to the invention are known or can be produced by methods known in the art for example as follows.

e. Chloroformic acid-2,6-diiodo-4-cyanophenyl ester 135.6 g (0.366 mole) 3,5-diiodo-4-hydroxybenzonitrile are suspended in a solution of 26 ml phosgene in 500 ml acetic ester. While stirring, a solution of 46.5 ml N,N-dimethylaniline in 500 ml acetic ester is dropped in at 0° to +5° C. Then the temperature is raided to 45° C within 15 minutes and stirring is continued at this temperature for 30 minutes. After cooling to room temperature, the product is filtered, the filtrate poured on ice, and the organic phase washed at 0° C with dilute hydrochloric acid and water. It is dried with magnesium sulfate and concentrated under reduced pressure. The residue crystallizes on addition of 500 ml pentane.

M.P.: 154°–157° C
Yield: 122.7 g = 78% of the theory

The production of the preparations of the compounds according to the invention, ready for use, and their mixtures, can be carried out in a well known manner, as by mixing or grinding processes. If desired, the single components may be mixed just before they are used, as is done in the practice for example in the so-called tank mixing process.

The following examples will illustrate the herbicidal action of the compounds of the invention and their mixtures.

EXAMPLE 1

In the greenhouse, millet (Echinochloa crus galli) and water rice were seeded in earth-filled pots.

After emergence of the millet and rice plants, they were allowed to grow to the 2–3 leaf stage. Then surface spraying was done with the active substances listed below in a quantity of 1 kg active substance per hectare, suspended or dissolved in 500 liters of water hectare. Two weeks after the treatment, the degree of damage of the plants was rated according to the rating scheme 0 – 10, where 0 means "totally destroyed" and 10 "not damaged."

As is evident from the table, the compounds according to the invention proved clearly superior to comparatively tested standard agents in the herbicidal action on millet and in the compatibility for rice.

| Compounds according to the invention | Rice | Millet |
|---|---|---|
| 1. Isopropylidenamino-2,6-diiodo-cyanophenyl-carbonate | 10 | 0 |
| 2. 3,3,5-trimethylcyclohexene-(5)-ylidenamino-(2,6-diiodo-4-cyanophenyl)-carbonate | 10 | 1 |
| 3. 1-ethylpropylidenamino-(2,6-diiodo-4-cyanophenyl)-carbonate | 10 | 0 |
| 4. 1-sec.-butyl-ethylidenamino-(2,6-diiodo-4-cyanophenyl)-carbonate | 10 | 0 |
| 5. 1-n-propylethylidenamino-(2,6-diiodo-4-cyanophenyl)-carbonate | 10 | 0 |
| 6. 1-ethyl-ethylidenamino-(2,6-diiodo-4-cyanophenyl)-carbonate | 10 | 0 |
| 7. 1-isopropylethylidenamino-(2,6-diiodo-4-cyanophenyl)-carbonate | 10 | 0 |
| 8. isopropylidenamino-(2,6-dibromo-4-cyanophenyl)-carbonate | 10 | 2 |
| 9. isopropylidenamino-(2,6-dichloro-4-cyanophenyl)-carbonate | 10 | 2 |
| 10. 1-methylpropylidenamino-(2,6-dibromo-4-cyanophenyl)-carbonate | 10 | 2 |
| 11. 4-methylpentyliden-2-amino(2,6-dibromo-4-cyanophenyl)-carbonate | 10 | 4 |
| 12. 1-isopropyl-2-methylpropylidenamino-(2,6-diiodo-4-cyanophenyl)-carbonate | 10 | 1 |
| 13. 1-isopropyl-4-methylpentylidenamino-(2,6-diiodo-4-cyanophenyl)-carbonate | 10 | 0 |
| 14. 1,2-dimethylbutylidenamino-(2,6-diiodo-4-cyanophenyl)-carbonate | 10 | 1 |
| 15. 2-ethyl-1-methyl-butylidenamino-(2,6-diiodo-4-cyanophenyl)-carbonate | 10 | 1 |
| 16. 1-isobutyl-3-methylbutylidenamino-(2,6-diiodo-4-cyanophenyl)-carbonate | 10 | 1 |
| 17. 1-ethylhexylidenamino-(2,6-diiodo-4-cyanophenyl)-carbonate | 10 | 0 |
| 18. 1-propylpentylidenamino-(2,6-diiodo-4-cyanophenyl)-carbonate | 10 | 2 |
| 19. ethyl-propylidenamino-(2,6-dibromo-4-cyanophenyl)-carbonate | 10 | 2 |
| 20. 1,2-dimethylpropylidenamino-(2,3-dibromo-4-cyanophenyl)-carbonate | 10 | 1 |
| 21. methyl-butylidenamino-(2,6-dibromo-4-cyanophenyl)-carbonate | 10 | 1 |
| 22. methylpentylidenamino-(2,6-dibromo-4-cyanophenyl)-carbonate | 10 | 3 |
| 23. propyl-butylidenamino-(2,6-dibromo-4-cyanophenyl)-carbonate | 10 | 2 |
| 24. methyl-heptylidenamino-(2,6-dibromo-4-cyanophenyl)-carbonate | 10 | 3 |
| 25. 1-ethyl-3-methylpentylidenamino-(2,6-dibromo-4-cyanophenyl)-carbonate | 10 | 4 |
| 26. 1-methyl-2-phenylethylidenamino-(2,6-dibromo-4-cyanophenyl)-carbonate | 10 | 1 |
| 27. 1-methyl-3-phenylpropylidenamino-2,6-dibromo-4-cyanophenyl)-carbonate | 10 | 1 |
| 28. 1-(4-methoxyphenyl)-ethylidenamino-(2,6-diiodo-4-cyanophenyl)-carbonate | 10 | 0 |

-Continued

| Compounds according to the invention | Rice | Millet |
|---|---|---|
| 29. 1-tert.-butylethylidenamino-(2,6-di-iodo-4-cyanophenyl)-carbonate | 10 | 0 |
| 30. cycloheptylidenamino-(2,6-dibromo-4-cyanophenyl)-carbonate | 10 | 2 |
| 31. 1-ethylidenhexylidenamino-(2,6-dibromo-4-cyanophenyl)-carbonate | 10 | 1 |
| 32. 1-butylpentylidenamino-(2,6-dibromo-4-cyanophenyl)-carbonate | 10 | 3 |
| 33. 1-phenoxymethylethylidenamino-(2,6-dibromo-4-cyanopphenyl)-carbonate | 10 | 3 |
| 34. 1,4-dimethylpentylidenamino-(2,6-dibromo-4-cyanophenyl)-carbonate 10 | 3 | |
| 35. isopropylidenamino-(2-bromo-6-iodo-4-cyanophenyl)-carbonate | 10 | 0 |
| 36. isopropylidenamino-(2-chloro-6-bromo-4-cyanophenyl)-carbonate | 10 | 2 |
| 37. 1-benzoylethylidenamino-(2,6-diiodo-4-cyanophenyl)-carbonate | 10 | 1 |

| Reference agent | | |
|---|---|---|
| 3,5-diiodo-4-hydroxy-benzonitrile | 10 | 10 |
| Untreated | 10 | 10 |

0 = totally destroyed
10 = not damaged

EXAMPLE 2

The plant species listed in the table were treated in post-emergence with the agents to be used according to the invention in dosage of 1 kg active substance per hectare. The agents were sprayed uniformly as aqueous emulsion in 500 liters per hectare.

This test shows the excellent effect of the compound according to the invention on important weeds combined with good compatibility for wheat, barley, rye and oat.

| Compounds according to invention | a | b | c | d | e | f | g | h | i | j | k | l | m | n |
|---|---|---|---|---|---|---|---|---|---|---|---|---|---|---|
| 1. isopropylidenamino-2,6-diiodo-4-cyanophenyl carbonate | 10 | 10 | 10 | 10 | 0 | 0 | 0 | 0 | 0 | 0 | 0 | 0 | 0 | 0 |
| 2. 3,3,5-trimethylcyclohexene-(5)-yiidenamino-(2,6-diiodo-4-cyanophenyl) carbonate | 10 | 10 | 10 | 10 | 1 | 0 | 2 | 0 | 0 | 1 | 0 | 0 | 0 | 4 |
| 3. 1-ethylpropylidenamino-(2,6-diiodo-4-cyanophenyl) carbonate | 10 | 10 | 10 | 10 | 0 | 0 | 0 | 0 | 0 | 0 | 0 | 0 | 0 | 0 |
| 4. 1-sec.butyl-ethylidenamino-(2,6-diiodo-4-cyanophenyl) carbonate | 10 | 10 | 10 | 10 | 0 | 0 | 0 | 0 | 0 | 0 | 0 | 0 | 0 | 0 |
| 5. 1-n-propylethylidenamino-(2,6-diiodo-4-cyanophenyl) carbonate | 10 | 10 | 10 | 10 | 0 | 0 | 0 | 0 | 0 | 0 | 0 | 0 | 0 | 0 |
| 6. 1-ethyl-ethylidenamino-(2,6-diiodo-4-cyanophenyl) carbonate | 10 | 10 | 10 | 10 | 0 | 0 | 0 | 0 | 0 | 0 | 0 | 0 | 0 | 0 |
| 7. 1-isopropylethylidenamino-(2,6-diio-4-cyanophenyl) carbonate | 10 | 10 | 10 | 10 | 1 | 0 | 0 | 0 | 0 | 0 | 0 | 0 | 0 | 0 |
| 8. isopropylidenamino-(2,6-dibromo-4-cyanophenyl) carbonate | 10 | 10 | 10 | 10 | 1 | 0 | 0 | 0 | 0 | 0 | 0 | 0 | 0 | 1 |
| 9. isopropylidenamino-(2,6-dichloro-4-cyanophenyl) carbonate | 10 | 10 | 10 | 10 | 1 | 0 | 1 | 0 | 0 | 0 | 0 | 0 | 0 | — |
| 10. isomethylpropylidenamino-(2,6-dichloro-4-cyanophenyl) carbonate | 10 | 10 | 10 | 10 | 5 | 0 | 0 | 1 | 0 | 0 | 0 | 0 | 1 | — |
| 11. 1-benzoyiethylidenamino-(2,6)-diiodo-4-cyanophenyl) carbonate | 10 | 10 | 10 | 10 | 0 | 0 | 0 | 1 | 0 | 0 | 0 | 0 | 0 | 1 |
| 12. methylpentylidenamino-(2,6-dichloro-4-cyanophenyl) carbonate | 10 | 10 | 10 | 10 | 3 | 0 | 1 | — | 0 | 2 | 0 | 1 | 1 | 0 |
| 13. 1,2,2-trimethylpropylidene-amino-(2,6-dibromo-4-cyanophenyl) carbonate | 10 | 10 | 10 | 10 | 0 | 0 | 0 | 0 | 0 | 0 | 0 | 0 | 0 | 0 |
| 14. methyl-hexylidenamino-(2,6-dibromo-4-cyanophenyl) carbonate | 10 | 10 | 10 | 10 | 0 | 0 | 0 | 0 | 0 | 0 | 0 | 0 | 1 | 0 |
| 15. methyl-hexylidenamino-(2,6-dichloro-4-cyanophenyl) carbonate | 10 | 10 | 10 | 10 | 3 | 0 | 0 | 4 | 0 | 4 | 0 | 0 | 1 | 0 |
| 16. diisobutylmethylenamino-(2,6-dibromo-4-cyanophenyl carbonate | 10 | 10 | 10 | 10 | 0 | 0 | 0 | 0 | 0 | — | 0 | 0 | 0 | 0 |
| 17. cyclopentylidenamino-(2,6-dibromo-4-cyanophenyl) carbonate | 10 | 10 | 10 | 10 | 0 | 0 | 0 | 0 | 0 | 0 | 0 | 0 | 0 | 0 |
| 18. cyclooctylidenamino-(2,6-dibromo-4-canophenyl) carbonate | 10 | 10 | 10 | 10 | 0 | 0 | 0 | 0 | 0 | 1 | 0 | 0 | 0 | 0 |

| Compounds according to invention | a | b | c | d | e | f | g | h | i | j | k | l | m | n |
|---|---|---|---|---|---|---|---|---|---|---|---|---|---|---|
| 19. methyldecylidenamino-(2,6-dibromo-4-cyanophenyl) carbonate | 10 | 10 | 10 | 10 | 0 | 0 | 0 | 1 | 0 | 2 | 0 | 0 | 0 | 0 |
| 20. 3,5,5-trimethyl-2-cyclohexenylidene-amino-(2,6-dibromo-4-cyanophenyl) carbonate | 10 | 10 | 10 | 10 | 0 | 0 | 1 | 3 | 0 | 1 | 0 | 0 | 0 | 0 |
| 21. cyclohexylidenamino-(2,6-dibromo-4-cyanophenyl) carbonate | 10 | 10 | 10 | 10 | 0 | 0 | 0 | 1 | 0 | 1 | 0 | 0 | 0 | 0 |
| 22. 1-methyl-1-2-methyl-butylidenamino-(2,6-dibromo-3-cyanophenyl) carbonate | 10 | 10 | 10 | 10 | 2 | 0 | 0 | 0 | 0 | 3 | 0 | 0 | 0 | 0 |
| 23. diisopropylmethylen-amino-(2,6-dibromo-4-cyanophenyl carbonate | 10 | 10 | 10 | 10 | 3 | 0 | 0 | 1 | 0 | 4 | 0 | 0 | 1 | 0 |
| 24. chloromethyl-phenyl-methylenamino-(2,6-dibromo-4-cyanophenyl) carbonate | 10 | 10 | 10 | 10 | — | 0 | 1 | — | 0 | — | 0 | 0 | 1 | — |
| 25. isopropylidenamino-(2-chloro-6-iodo-4-cyanophenyl) carbonate | 10 | 10 | 10 | 10 | 3 | 0 | 0 | 1 | 0 | 4 | 0 | 0 | 0 | 0 |

Legend a = Wheat
b = Barley
c = Rye
d = Oat
e = Stellaria media
f = Senecio vulgaris
g = Matricaria chamomilla
h = Lamium amplexicaule
i = Centaurea cyanus
j = Amarantus retroflexus
k = Chrysanthemum segetum
l = Polygonum lapathifolium
m = Ipomoea purpurea
n = Galium aparine 0 = totally destroyed
10 = not damaged

EXAMPLE 3

In the greenhouse, the plants listed below were treated with the compounds according to the invention and their mixture in a dosage of 0.3 kg active substance per hectare. The agents were sprayed on the plants uniformly as aqueous emulsions at 500 liters per hectare. Twelve days after the treatment, the mixture showed a clearly better effect than the single components.

| | Active substance or Mixture | Mixture Ratio | Quantity used kg/ha | Stellaria media | Gentaurea cyanus | Galium aparine | Matricaria cham. |
|---|---|---|---|---|---|---|---|
| 1. | isopropylidenamino-2,6-diiodo-4-cyanophenyl carbonate (I) | | 0.3 | 4 | 8 | 8 | 4 |
| 2. | 3,3,5-trimethylcyclohexene-(5)-yliden-amino-(2,6-diiodo-4-cyanophenyl) carbonate (II) | | 0.3 | 5 | 1 | 5 | 0 |
| | I + II | 1:1 | 0.3 | 2 | 0 | 1 | 0 |
| | Untreated | | | 10 | 10 | 10 | 0 |

0 = totally destroyed
10 = not damaged

EXAMPLE 4

This example shows the synergistic effect of mixtures according to the invention which contain known weed killers in addition to the defined compounds.

The plants listed below were treated with the following known agents in a dosage of 0.3 kg active substance per hectare.

2-methyl-4-chlorphenoxyacetic acid (I)
alpha-(4-chloro-2-methylphenoxy)-propionic acid (II)
alpha-(2,4-dichlorophenoxy)-propionic acid (III)
2-chloro-4,6-diethylamino-1,3,5-triazine (IV)

Furthermore, additional plants were treated with mixtures of these known agents stated in the table with isopropylidenamino-2,6-diiodo-4-cyanophenyl carbonate (A). The quantity used was again 0.3 kg total active substance per hectare.

The agents were sprayed on the plants uniformly as aqueous dispersions at 500 liters water per hectare. Eighteen days after the treatment, the degree of damage of the plants was determined and rated according to the rating code 0 – 10 with 0 = "totally destroyed" and 10 = "not damaged."

| Active substance or mixture | Mixture ratio | Wheat | Barley | Rye | Oat | a | b | c | d | e | f | g | h |
|---|---|---|---|---|---|---|---|---|---|---|---|---|---|
| I | | 10 | 10 | 10 | 10 | 3 | 7 | — | 1 | 3 | 1 | 5 | 10 |
| II | | 10 | 10 | 10 | 10 | 3 | 5 | 10 | 1 | 5 | 3 | 5 | 8 |
| III | | 10 | 10 | 10 | 10 | 3 | 5 | 10 | 2 | 4 | 2 | 2 | 9 |
| IV | | 8 | 8 | 8 | 8 | 0 | 0 | 5 | 2 | 0 | 2 | 0 | 5 |
| I + A | 1:1 | 10 | 10 | 10 | 10 | 0 | 0 | — | 0 | 0 | 0 | 0 | 0 |
| II + A | 1:1 | 10 | 10 | 10 | 10 | 0 | 0 | 5 | 0 | 0 | 0 | 0 | 0 |
| III + A | 1:1 | 10 | 10 | 10 | 10 | 0 | 0 | 8 | 0 | 0 | 0 | 0 | 5 |
| IV + A | 1:1 | 9 | 9 | 9 | 9 | 0 | 0 | 0 | 0 | 0 | 0 | 0 | 0 |
| Untreated | | 10 | 10 | 10 | 10 | 10 | 10 | 10 | 10 | 10 | 10 | 10 | 10 |

0 = totally destroyed
10 = not damaged

Legend
a = *Sinapis sp.*
b = *Senecio vulgaris*
c = *Matricaria chamomilla*
d = *Centaurea cyanus*
e = *Amarantus retroflexus*
f = *Ipomoea purpurea*
g = *Polygonum lapathifolium*
h = *Chrysanthemum segetum*

We claim:
1. Compounds having the formula:

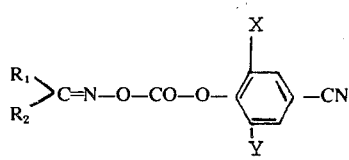

wherein $R_1$ is hydrogen, phenyl, naphthyl, alkyl of 1 to 12 carbons, cycloalkyl of 5 to 8 carbons, benzyl or phenylethyl; $R_2$ is phenyl, naphthyl, alkyl of 1 to 12 carbons, cycloalkyl of 5 to 8 carbons, benzyl or phenylethyl; and x and y are the same or different halogen atoms elected from the group consisting of chlorine, bromine or iodine.

2. A compound of the formula set forth in claim 1 and is isopropylidenamino-2,6-diiodo-4-cyanophenyl carbonate.

3. A compound of the formula set forth in claim 1 and is 3,3,5-trimethylcyclohexene-(5)-ylidenamino-(2,6-diiodo-4-cyanophenyl) carbonate.

4. A compound of the formula set forth in claim 1 and is 1-ethylpropylidenamino-(2,6-diiodo-4-cyanophenyl) carbonate.

5. A compound of the formula set forth in claim 1 and is 1-sec.-butyl-ethylidenamino-(2,6-diiodo-4-cyanophenyl) carbonate.

6. A compound of the formula set forth in claim 1 and is 1-n-propylethylidenamino-(2,6-diiodo-4-cyanophenyl) carbonate.

7. A compound of the formula set forth in claim 1 and is 1-ethyl-ethylidenamino-(2,6-diiodo-4-cyanophenyl) carbonate.

8. A compound of the formula set forth in claim 1 and is 1-isopropylethylidenamino-(2,6-diiodo-4-cyanophenyl) carbonate.

9. A compound of the formula set forth in claim 1 and is isopropylidenamino-2,6-dibromo-4-cyanophenyl carbonate.

10. A compound of the formula set forth in claim 1 and is isopropylidenamino-2,6-dichloro-4-cyanophenyl carbonate.

11. A compound of the formula set forth in claim 1 and is 1-methylpropylidenamino-(2,6-dibromo-4-cyanophenyl) carbonate 12. A compound of the formula set forth in claim 1 and is 1-methylpropylidenamino-(2,6-dichloro-4-cyanophenyl) carbonate.

* * * * *